United States Patent [19]

Eastmond

[11] 3,904,969

[45] Sept. 9, 1975

[54] AUDIO PERIODICITY SQUELCH SYSTEM

[75] Inventor: Bruce C. Eastmond, Darien, Ill.

[73] Assignee: Motorola, Inc., Chicago, Ill.

[22] Filed: Mar. 7, 1974

[21] Appl. No.: 449,184

[52] U.S. Cl. ................ 325/478; 307/233; 325/348; 325/476; 325/480

[51] Int. Cl.² ............................................ H04B 1/12

[58] Field of Search ........... 325/319, 329, 330, 348, 325/400, 402, 403, 408, 473–476, 478, 480, 323, 324; 179/1 CN, 15 AS, 18 BC, 1 SA, 1 VC; 307/233; 328/140, 141

[56] References Cited

UNITED STATES PATENTS

| | | | |
|---|---|---|---|
| 3,437,937 | 4/1969 | Warfield | 325/478 |
| 3,723,771 | 3/1973 | McLean | 307/261 |
| 3,769,591 | 10/1973 | Brown et al. | 325/474 |
| 3,843,928 | 10/1974 | Nishimura et al. | 325/348 |

*Primary Examiner*—Robert L. Griffin
*Assistant Examiner*—Marc E. Bookbinder
*Attorney, Agent, or Firm*—Eugene A. Parsons; James W. Gillman

[57] ABSTRACT

Squelch circuit responsive to the periodicity of a voice signal for controlling the output of a radio receiver to provide transmission of speech and reject noise. The audio signal from the receiver is amplitude limited and the transitions in the limited wave control a bistable multivibrator having first and second out-of-phase outputs. The outputs are used to activate circuits which produce voltage samples proportional to the time period between zero crossings, with the alternate periods producing voltages across two capacitors. The difference between the successive voltage samples is derived and compared with a reference voltage to provide a control voltage The control voltage, which is produced as long as the difference between the samples is less than the reference, is applied to a gate circuit which controls the charging of a squelch control capacitor. A control voltage which continues through a plurality of samples causes the voltage across the squelch control capacitor to raise to a level which operates a squelch switch to allow transmission of the audio signal.

10 Claims, 2 Drawing Figures

AUDIO PERIODICITY SQUELCH SYSTEM

BACKGROUND OF THE INVENTION

For staisfactory operation of communications receivers, a squelch circuit is commonly provided which automatically disables the audio output when an intended signal is not received, to thereby prevent the reproduction of noise which is produced by the receiver when a signal is not present. In frequency modulation receivers, the received carrier wave can be used to provide information for squelch control. However, in other types of receivers, such as single sideband receivers where no such carrier information is available, the squelch control must be derived from the audio signal of the receiver itself. It is important that the squelch action is not responsive to variations in noise to which the receiver is subjected, such as atmospheric and impulse noise which may be present in the frequency range of operation of the receiver.

Squelch circuits have been provided for use in single sideband receivers but known circuits have not been entirely satisfactory. The known circuits have been subject to falsing as a result of changes in ambient atmospheric noise levels and in response to high impulse noise. These circuits have been relatively critical of adjustment and require readjustment of the threshold when subjected to changing atmospheric noise levels. Also, known squelch systems which respond to characteristics of the audio signal have had the disadvantage that they require a careful balancing adjustment to reject impulse noise.

SUMMARY OF THE INVENTION

It is an object of the present invention to provide an improved squelch system for use with single sideband communications receivers.

A further object of the invention is to provide a squelch circuit for a communications receiver wherein the squelch control voltage is derived solely from the characteristics of the audio frequency signal produced by the receiver.

A still further object of the invention is to provide a squelch control system which responds to the audio frequency signal of the receiver, which is not sensitive to the amplitude of the received signal, and which rejects atmospheric and impulse noise.

Another object of the invention is to provide a squelch circuit which responds to the periodicity of a voice or tone signal reproduced by the receiver.

In accordance with the invention, a squelch circuit is coupled to the audio output of the receiver and includes a high gain saturating amplifier for limiting the audio output. A differentiating circuit coupled to the limiter output triggers a bistable multivibrator at each transition or zero crossing of the limited wave. The multivibrator has first and second out-of-phase outputs, each providing successive periods of the same duration as the half cycles of the limited audio signal. The multivibrator outputs control switches for charging first and second capacitors to produce voltages corresponding to the durations of the half cycles, with these voltages being transferred to storage capacitors which hold the voltage from one cycle to the next. The voltages across the two storage capacitors are differentially combined, with the resultant voltage being zero or small for periodic signals, and relatively large for non-periodic signals such as produced by noise. When the resultant signal is below a specified value, it provides a control voltage which operates a gating circuit to charge a capacitor to provide the squelch voltage. This squelch voltage continues to increase as long as the resultant signal is small to indicate the reception of a periodic signal, and when the capacitor charges to a predetermined value, the voltage thereacross controls a squelch switch to permit the reproduction of the audio signal of the receiver.

DETAILED DESCRIPTION

Figure 1:
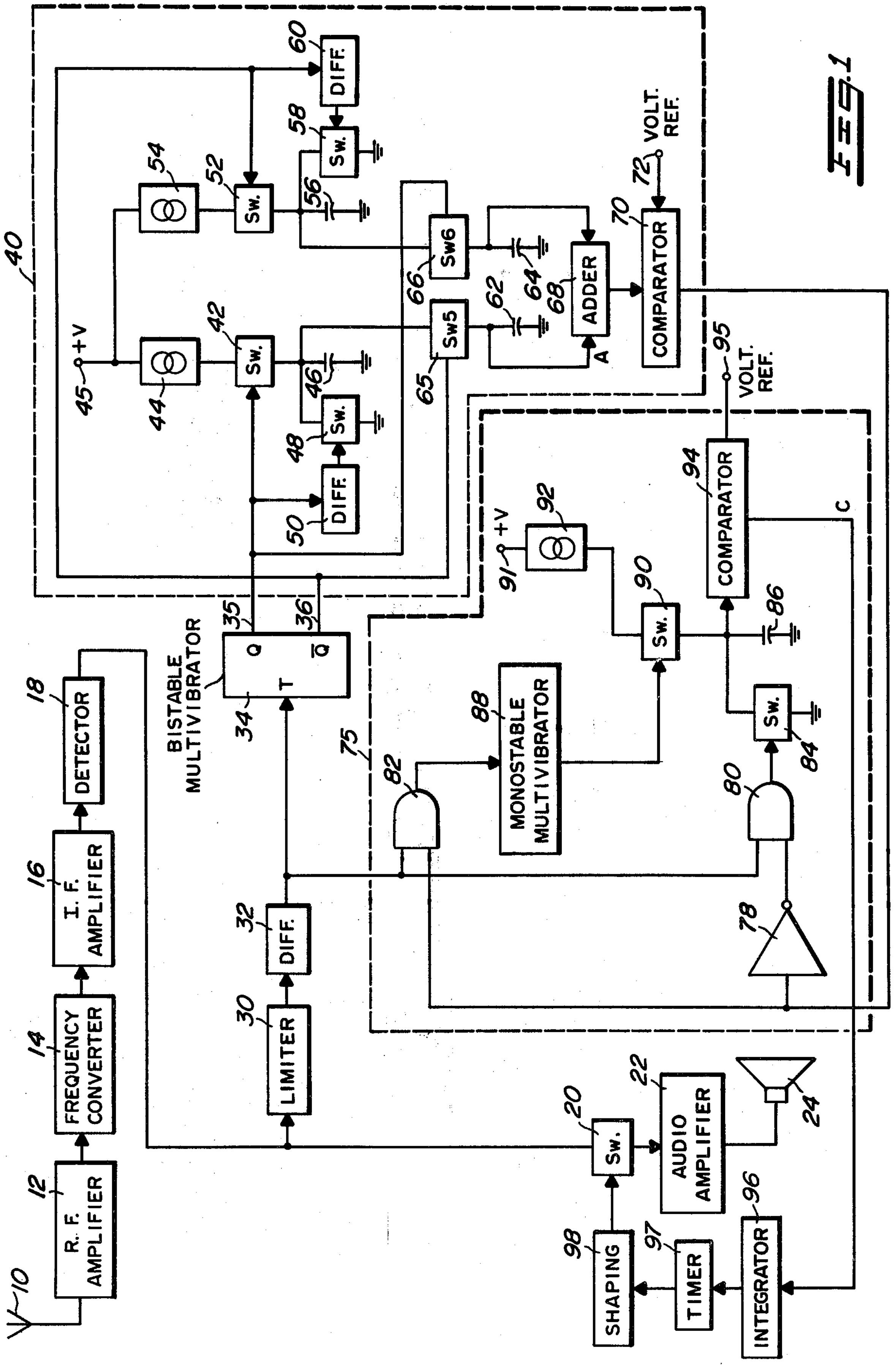
FIG. 1 is a block diagram of a receiver including the squelch circuit of the invention.

FIG. 1 shows the receiver and squelch system therefor in block diagram form. An antenna 10 applies signals to the RF amplifier 12 of the receiver, and the received signals are reduced in frequency by frequency converter 14. The intermediate frequency signals at the output of the converter 14 are amplified in intermediate frequency amplifier 16, and the modulation is derived therefrom by detector 18. The detected audio signal, which may include voice signals, is applied through squelch switch 20 to audio amplifier 22. The audio output is reproduced by a loudspeaker 24, or other audio reproducing means.

The squelch circuit includes a limiter 30 which may be a high gain saturating amplifier. The limited output is applied to differentiating circuit 32 which produces trigger pulses at the zero crossings of the limited wave. The trigger pulses are applied to bistable multivibrator 34 which has two outputs 35 and 36 at which out-of-phase pulse waves are produced. Each output switches between a high value and a low value, or vice versa, at each zero crossing of the limited wave.

Figure 2:
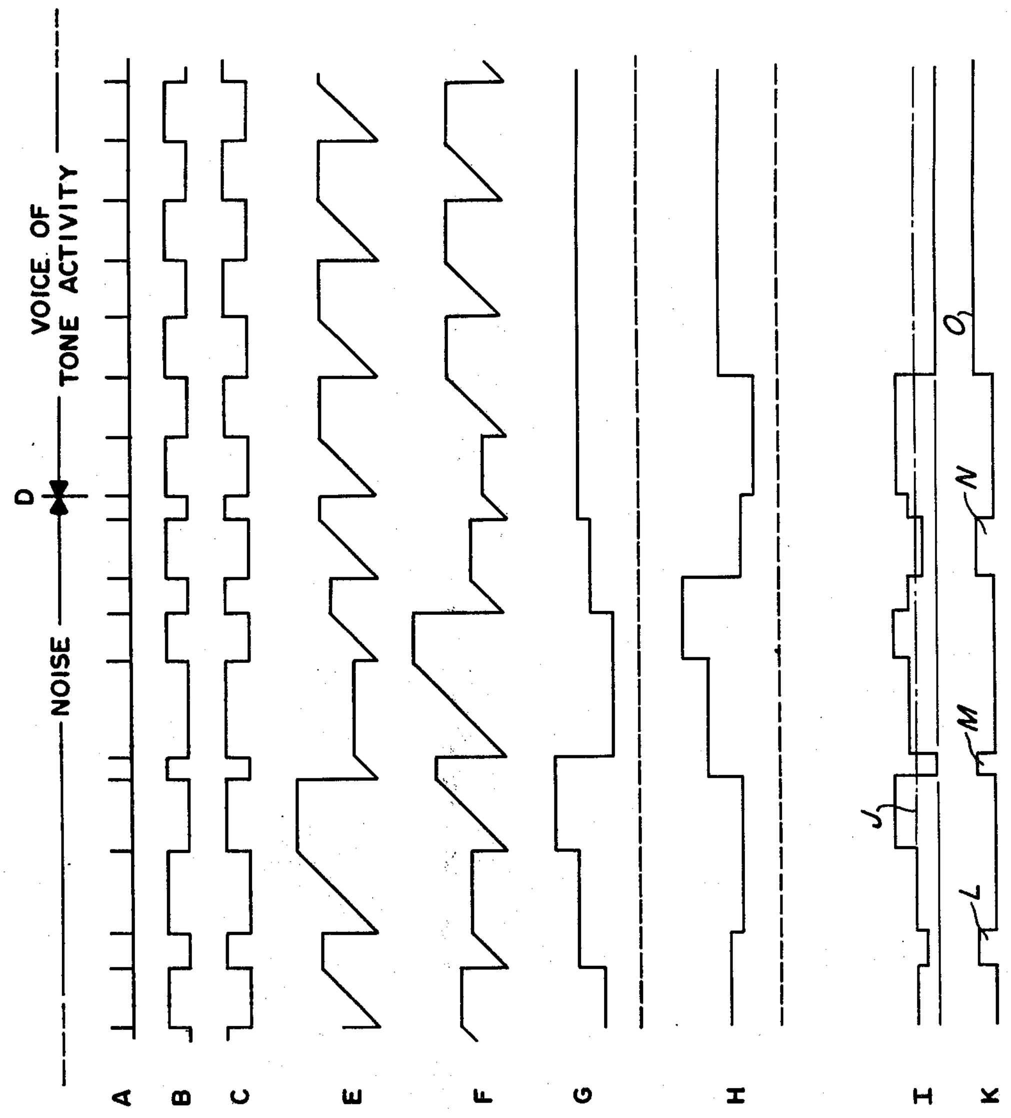
FIG. 2 is a chart including waveforms illustrating the operation of the system of FIG. 1.

Referring now to FIG. 2, line A shows the output of the differentiator 32, which provides trigger pulses at each zero crossing of the limited wave. Line B shows the pulse wave produced at output 35 of the multivibrator 34, and line C shows the pulse wave produced at the output 36. It is seen that these waves are out-of-phase, but otherwise identical. The left side of FIG. 2 shows the response to noise or random signals, whereas the right side, beyond point D, shows the response to a voice or tone signal.

Referring again to FIG. 1, the two outputs of the multivibrator 34 are applied to a periodicity sensing circuit 40. This circuit includes two like sections which are responsive to the two outputs of the multivibrator 34. Coupled to the output 35 is a switch 42 which controls the current applied through current regulator 44 from the potential supply 45. The current applied through regulator 44 and switch 42 acts to charge capacitor 46. Connected across the capacitor 46 is a switch 48 which is controlled by differentiating circuit 50. The differentiating circuit 50 is also coupled to the output 35 of the multivibrator 34, and provides a pulse at each positive going transition of the output 35 to close switch 48 and discharge capacitor 46. The switch 42 is held closed during the entire positive portions of the wave at output 35 to charge the capacitor 46 at a substantially linear rate during the periods of the positive portions of the wave.

The operation of the switches 42 and 48 is illustrated by lines B and E in FIG. 2, wherein it is shown that each time the wave at output 35 (line B) goes positive, the voltage across capacitor 46 (line E) drops to zero as the switch 48 operates to short this capacitor. Then during each positive portion of the wave at output 35 (line B), the voltage across capacitor 46 (line E) rises linearly until the end of the positive portion. The voltage across capacitor 46 (line E) will hold at its maximum value until the beginning of the next positive portion, when the switch 48 operates again to discharge the capacitor.

The second section of the periodicity sensing circuit 40 is connected to the output 36 of the multivibrator 34, and includes switch 52 which controls the current through regulator 54 to charge capacitor 56. The regulator 54 will provide the same current as the regulator 44, and the capacitor 56 will have the same value as capacitor 46, so that the voltage increases at the same rate across capacitor 56 as across capacitor 46. Connected across capacitor 56 is switch 58, which is controlled by the differentiating circuit 60. The differentiating circuit 60 provides a pulse each time the voltage wave at output 36 goes positive to discharge capacitor 56, and the positive portions of the wave at output 36 close switch 52 to charge capacitor 56 substantially linearly during these positive portions.

The operation of the circuit including switches 52 and 58 is shown by lines C and F in FIG. 2, wherein the capacitor 56 discharges each time the wave at output 36 (line C) goes positive, and then the capacitor charges substantially linearly (line F) during the positive portions of the wave. Capacitor 56 holds at the maximum value reached during the negative portions of the wave at output 36.

The voltages on capacitors 46 and 56 are transferred to capacitors 62 and 64, respectively, by operation of the switches 65 and 66. Switch 65 is operated when the potential at output 36 goes positive, to transfer the voltage from capacitor 46 to capacitor 62. This is indicated by line G in FIG. 2, which assumes the same value as line E each time the wave in line C goes to a positive value. The same value is held by capacitor 62 until the next positive transition of the wave on line 36, at which time the capacitor 62 will again charge (or discharge) to the voltage of capacitor 46. Similarly, switch 66 opens when the output 35 goes positive to transfer the voltage from capacitor 56 to capacitor 64. The capacitor 64 likewise holds the voltage until the potential at 35 goes positive the next time, and the voltage on capacitor 56 at that time is then transferred to capacitor 64. The voltage across capacitor 64 is illustrated by line H in FIG. 2.

The two voltages across capacitors 62 and 64 are differentially combined in adder circuit 68, which produces an output voltage represented by the difference between the voltages across capacitors 62 and 64. This resultant voltage will be present regardless of which capacitor has a larger voltage, and will be a measure of the difference between the voltages. This resulting voltage is applied to comparator 70, to which a reference voltage 72 is applied, and comparator 70 will provide an output voltage when the reference voltage 72 is larger than the resultant voltage from adder circuit 68.

In FIG. 2, line I shows the resultant voltage produced by adder circuit 68 in response to the voltages across capacitors 62 and 64, shown by lines G and H. This voltage is applied to comparator 70 along with a reference voltage 72 shown by line J. The comparator will produce output pulses, shown by line K, when the resultant voltage produced by adder circuit 68 is at a value below the reference voltage 72 applied to comparator 70.

The output of the comparator 72 is applied to a timing circuit 75, which is shown in dotted lines. The output of the comparator 70 is applied through inverter 78 to gate 80, and is also applied to gate 82. Gate 80 operates switch 84 to discharge control capacitor 86. Gate 82 controls monostable multivibrator 88 which operates switch 90 connected in circuit with regulator 92 to connect capacitor 86 to the voltage supply 91. The gates 80 and 82 each have a second inupt connected to the output of differentiating circuit 32. Accordingly, each time the limited wave at the output of limiter 30 has a transition, the gates 80 and 82 will be enabled. If the comparator 70 has a low voltage output, produced when the difference voltage exceeds the reference voltage 72, this will operate gate 80 to close switch 84 to discharge capacitor 86. When the comparator 70 has a high output, this will enable gate 82 to trigger monostable multivibrator 88. The multivibrator 88 when triggered will operate switch 90 for a period of time to apply current to capacitor 86 to charge the same.

In the event that the comparator output 70 is high and actuates gate 82 for a relatively long period of time, the switch 90 will close periodically and cause capacitor 86 to charge to a relatively high value. The voltage on capacitor 86 is applied to a comparator 94 to which a reference voltage 95 is applied. When the voltage across capacitor 86 exceeds the reference voltage 95, the comparator will produce an output which is the squelch control potential. This potential is applied through integrator 96 to timer 97 which controls the shaping circuit 98, which in turn controls the squelch switch 20. The operation of the integrator, timer and shaping circuit can be as described in my co-pending application Ser. No. 449,119 filed Mar. 7, 1974, now U.S. Pat. No. 3,873,925. The timer is operative to hold the audio circuit operative during pauses in speech, and during short fades in the signal.

Referring again to FIG. 2, when the output of the comparator 70 goes positive, as shown by line K, this operates the timing circuit 75 to charge the capacitor 86. During the three pulses in line K, marked L, M, and N, the capacitor 86 will charge, but since the pulses are of short duration, the capacitor will not charge to a voltage which is greater than the reference voltage 95 so that comparator 94 will not have an output. However, when an audio signal containing periodic voice components or tone activity is received, as shown by the right side of FIG. 2, the output of comparator 70 shown by O in line K will continue for a sufficient time to charge capacitor 86 to a value above the reference voltage 95 to produce an output from comparator 94 which will open the squelch and cause the received audio signal to be reproduced.

The squelch system of the invention responds to the periodicity of a voice or tone signal and is not responsive to the amplitude of the signal nor to atmospheric or impulse noises. Accordingly, it provides the desired operation when used with a single sideband receiver. The system can be used in any application where it is desired to distinguish a periodic audio signal, such as voice or tone, from a noise signal or other undesired nonperiodic signal.

I claim:

1. A squelch system for controlling the passage of audio signals including periodic signals received in the presence of noise, which system responds to the periodicity of the signals, including in combination:

- pulse producing means for receiving an audio signal having first and second outputs providing pulses of opposite polarities, said pulses extending between zero crossings of the audio signal,
- first and second capacitor means for storing voltages thereon,
- first control means coupled to said first and second outputs of said pulse producing means and to said first capacitor means for charging said first capacitor means to a voltage which depends upon the duration of each pulse of one polarity at said first output,
- second control means coupled to said first and second outputs of said pulse producing means and to said second capacitor means for charging said second capacitor means to a voltage which depends upon the duration of each pulse of said one polarity at said second output,
- comparator means coupled to said first and second capacitor means and responsive to the voltage stored thereon for producing an output signal when the difference between the voltages on said first and second capacitor means is less than a given value; and
- control circuit means including a squelch switch connected to receive the output signal from said comparator means and said audio signal to control the transmission of audio signals in response thereto.

2. A squelch system in accordance with claim 1 wherein said pulse producing means includes limiter means for limiting the amplitude of the audio signal, and bistable multivibrator means coupled to said limiter means and triggered by the output thereof each time such output makes a transition from one output to the other, said multivibrator having first and second outputs providing said pulses of opposite polarities.

3. A squelch system in accordance with claim 1 wherein said first control means includes a third capacitor means, first switch means coupled to said first output and to said third capacitor means for discharging said capacitor at the beginning of each pulse of said one polarity at said first output, second switch means coupled to said first output and to said third capacitor means for charging said first capacitor at a substantially constant rate for the duration of said pulse of said one polarity, and third switch means coupled to said second output and coupling said third capacitor means to said third capacitor means during said pulse of said one polarity at said second output for transferring the voltage on said first capacitor to said third capacitor means.

4. A squelch system in accordance with claim 1 wherein said comparator means includes combining means connected to said first and second capacitor means for producing a resultant voltage corresponding to the difference between the voltages stored on said first and second capacitor means, and means coupled to said combining means and responsive to a reference voltage for producing a control voltage when said resultant voltage has a value less than said reference voltage.

5. A squelch system in accordance with claim 4 wherein said control circuit means includes a control capacitor, means for charging said control capacitor including switch means for controlling the time said control capacitor is charged, gate means coupled to said switch means and to said comparator means for rendering said switch means operative to charge said control capacitor in response to said control voltage, and further comparator means coupled to said control capacitor and responsive to a further reference voltage for producing a squelch control voltage when the voltage across said control capacitor exceeds said further reference voltage and supplying said squelch control voltage to said squelch swtich.

6. A squelch system in accordance with claim 5 wherein said switch means includes first and second switches, said first switch being connected across said control capacitor to discharge the same and said second switch being connected to apply current to said control capacitor to charge the same, and wherein said gate means includes first and second gates with said first gate being coupled to said first switch for operating the same to discharge said control capacitor in the absence of said control voltage, and said second gate being coupled to said second switch for operating the same in response to said control voltage.

7. A squelch system in accordance with claim 6 wherein said pulse producing means includes limiter means for limiting the audio signal, and means coupling said limiter means to said first and second gates for enabling said gates each time the output of said limiter means makes a transition from one polarity to the opposite polarity.

8. A squelch system in accordance with claim 7 further including a monostable multivibrator coupled to said second gate for operating said second switch, said monostable multivibrator rendering said second switch operative for a predetermined time period each time said second gate operates.

9. A squelch system in accordance with claim 5 wherein said control circuit means further includes circuitry coupling said further comparator means to said squelch switch for operating said squelch switch in response to said squelch control voltage.

10. A squelch system in accordance with claim 9 wherein said circuitry includes timer means for controlling the time said squelch switch is operated.

* * * * *